Sept. 29, 1931. J. H. SCHLAFLY 1,825,287
ARTICLE FEEDING AND STRIPPING MACHINE
Filed May 22, 1928 2 Sheets-Sheet 2
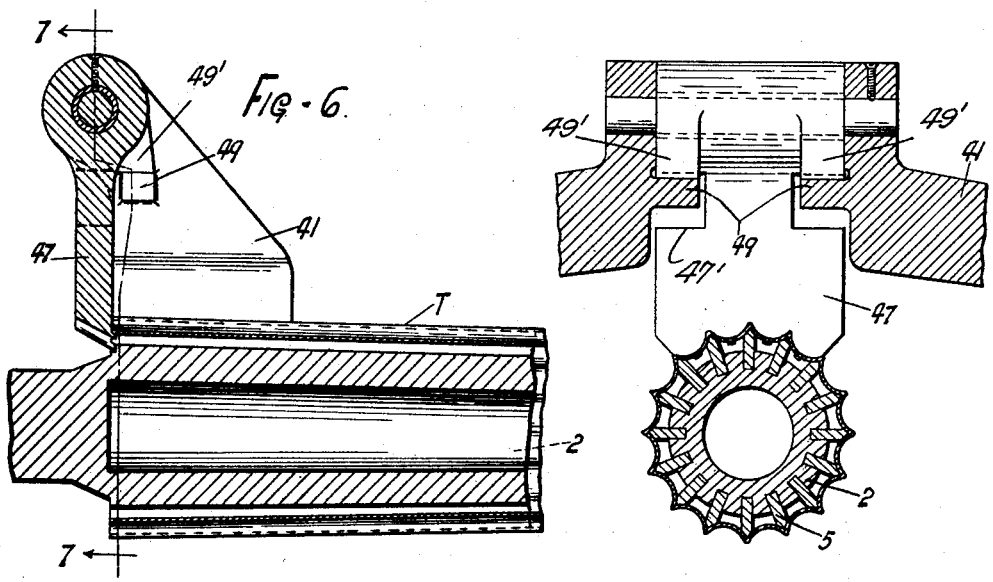
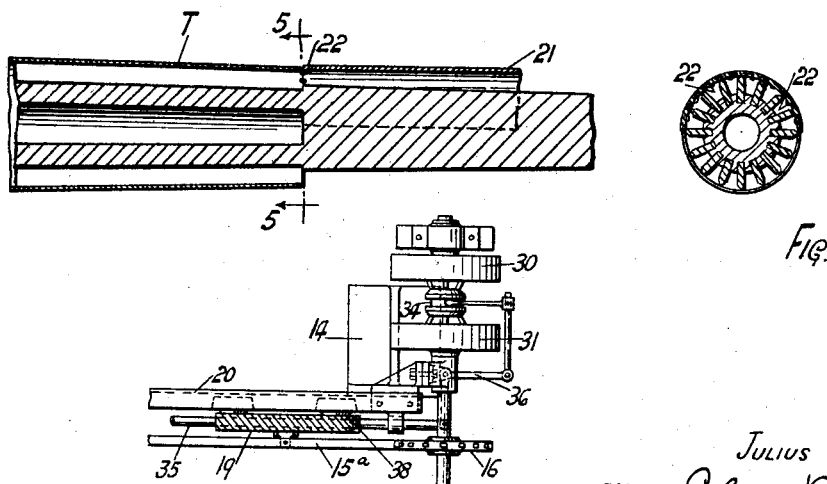
INVENTOR.
JULIUS H. SCHLAFLY.
BY Elyt Barrow
ATTORNEYS.

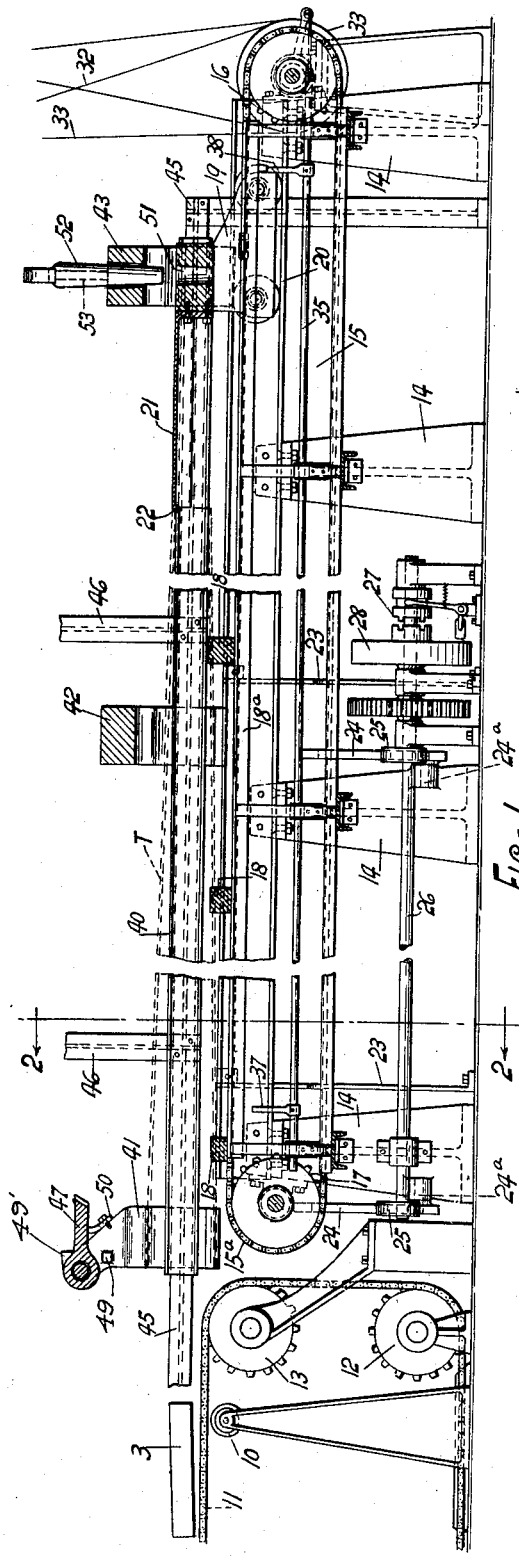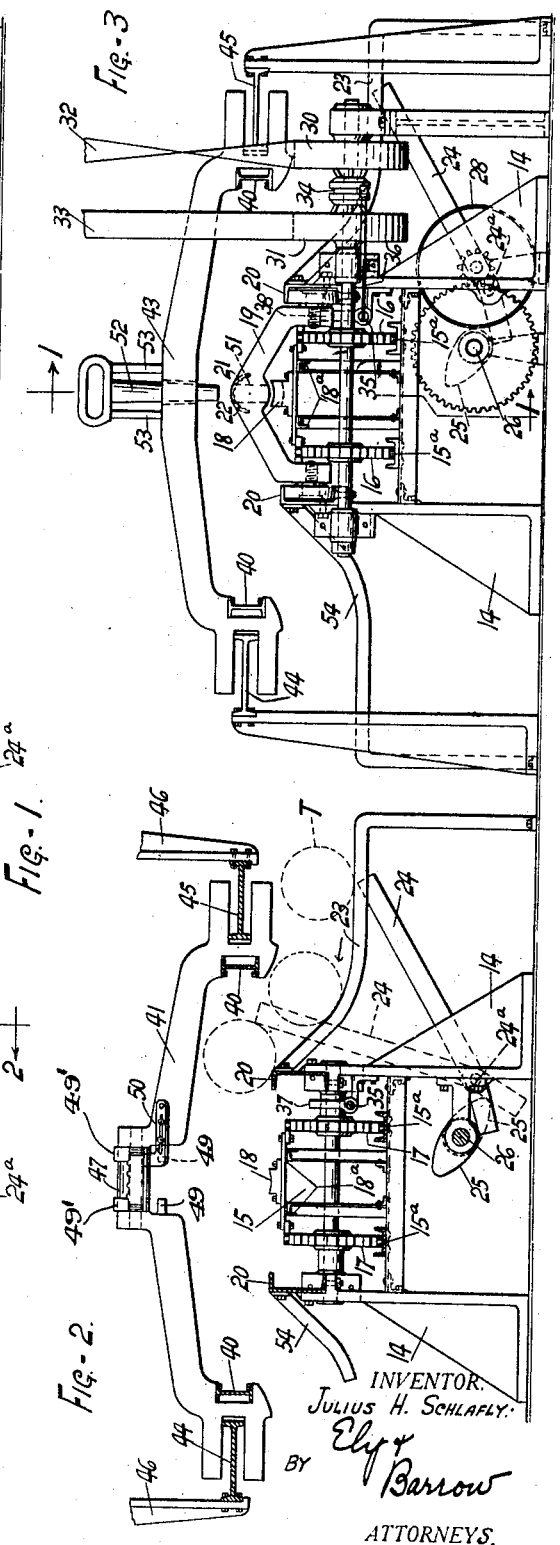

Patented Sept. 29, 1931

1,825,287

UNITED STATES PATENT OFFICE

JULIUS H. SCHLAFLY, OF CANTON, OHIO

ARTICLE FEEDING AND STRIPPING MACHINE

Application filed May 22, 1928. Serial No. 279,777.

This invention relates to devices for handling elongated articles, such as pipes or tubes, for use in association with forming machines, such as column fluting machines.

The general purposes of the invention are to provide devices for feeding the articles to the forming machine and for stripping or removing the articles from the forming machine so as to dispense with the greater part of the labor incident to handling of the articles and utilizing a minimum of floor space.

More particularly the invention has for an object the provision of a conveyor for supplying the tubes to the forming machine and apparatus in association therewith for use in supplying the tubes to the conveyor.

Another object of the invention is to provide means for withdrawing a tube from the forming machine onto a conveyor from which it can be removed.

A further object is to provide, in combination, a conveyor for supplying tubes to the forming machine and apparatus operable thereby to withdraw the tube from the forming machine onto the conveyor.

A further object of the invention is to provide a tube-handling device for use in combination with a tube-forming device such as shown in my patent No. 1,714,108, granted May 21, 1929.

The foregoing and other objects of the invention are attained in the apparatus illustrated in the accompanying drawings and described below. It is to be understood that the invention is not limited to the specific form thereof shown and described.

Of the accompanying drawings,

Fig. 1 is a longitudinal section on line 1—1 of Fig. 3 of apparatus embodying the invention, partly broken away to decrease the length of the view and illustrated in association with the work-entering end of the forming machine shown and described in the patent above referred to;

Fig. 2 is a section on line 2—2 of Fig. 1;

Fig. 3 is a right end view of the apparatus;

Fig. 4 is a detail longitudinal section illustrating the tube pusher;

Fig. 5 is a section on line 5—5 of Fig. 4;

Fig. 6 is a detail longitudinal section of the tube-withdrawing element in operative relation to a finished tube on the forming mandrel;

Fig. 7 is a section on line 7—7 of Fig. 6; and

Fig. 8 is a detail plan of the conveyor actuating drive mechanism.

Referring to the drawings, the numeral 3 designates the free end of a forming mandrel, such as the mandrel 2 shown in Figs. 6 and 7, which may be the mandrel of a column-forming machine as disclosed in the patent above referred to, and is provided with flute-forming ribs 5, the mandrel end 3 being adapted to be elevated above a supporting roller 10 to receive the tube to be formed thereon. The numeral 11 indicates one of the chains traveling over sprockets 12 and 13 at the work-receiving end of the forming machine disclosed in said patent, these chains serving to actuate the forming instrumentalities.

A series of pairs of standards 14, 14 are arranged to support a conveyor 15 in alinement with the forming mandrel 2 of the forming machine, conveyor 15 comprising spaced, endless chains 15ª, 15ª passing over a pair of drive sprockets 16, 16 and a pair of idler sprockets 17, 17 respectively journaled on the end pairs of standards 14. Connected across chains 15ª are cradles 18, 18 for receiving and supporting the tubes or pipes, and a slide or skid 18ª is arranged to provide a support along which the cradles ride.

Chains 15ª, 15ª are connected to a carriage 19 operable along rails 20, 20 supported on standards 14, and carriage 19 carries a pusher 21 shaped as shown in Figs. 4 and 5 to engage the end of the pipe to be formed, which latter is designated T, the pusher 21 preferably having lips indicated at 22, engaging in the bore of the pipe to hold the pusher in operative relation to the pipe.

To deliver the pipes or tubes T onto the conveyor mechanism described above, spaced rails 23 are provided on one side of the conveyor on which the tubes T can be mounted and from which they may be rolled onto cradles 18. Rails 23 are shown inclined to elevate the tubes onto the cradle.

Suitable mechanism may be provided for rolling the tubes up the rails 23, for instance, swinging arms 24, 24 are shown pivoted at 24ª, 24ª onto standard 14 and adapted to be actuated by cams 25, 25 on a drive shaft 26 which may be operable through suitable gearing as shown through a clutch 27 by a driven pulley 28.

Driving of conveyor 15 in either direction may be provided for by use of any suitable power means, a pulley drive being shown including pulleys 30 and 31 rotatable on the shaft of sprockets 16 and driven in reverse directions respectively by belts 32 and 33, a clutch 34 being provided to connect the sprockets 16 to either pulley.

Clutch 34 is operable by a shiftable rod 35 extending longitudinally through the brackets supported on standards 14 on one side of the machine, whereby the clutch may be manually operated from any point along the machine, the rod 35 being connected to the clutch through bell-crank lever mechanism 36.

It is preferable that the conveyor 15 be automatically reversed at the end of its movement toward the forming machine. To this end a trip arm 37 is secured on rod 35 and arranged to be engaged by carriage 19 to disconnect the clutch 34 from the forward drive pulley and connect it with the reverse drive pulley. The clutch 34 may also be automatically disengageable when the carriage 19 has returned to its initial position as shown in Fig. 1 by the provision of a trip arm 38 on rod 35.

A tube-withdrawing device is shown in association with conveyor 15 and preferably is arranged to be actuated thereby. This device comprises a sliding frame or carriage including side beams 40, 40 and spanning members 41, 42, and 43, slidably supported on rails 44 and 45 suspended over the conveyor 15 by overhead supports 46, 46.

The spanning member 41 of the carriage supports a pivoted dog or pawl 47, the free end of which is formed to fit between the fluting ribs 5 of the mandrel 2 on the forming machine, as shown in Figs. 6 and 7, to engage in back of the remote end of the formed tube T in the forming machine, the pivoting of the pawl permitting it to ride back over the tube into the position shown in the above figures for a withdrawing operation, stops 49' being provided on the pawl and other stops 49 on the support to hold it in operative position in back of the pipe end. The pawl is recessed as at 47' to allow it to pass the stops 49. In order to keep the dog or pawl 47 out of the way during the feeding of a tube into the forming machine, it is arranged to be releasably locked in inoperative position as shown in Fig. 1 by a latch 50.

For actuating the tube-withdrawing mechanism, carriage 19 is provided with a socket member 51 in which a pin 52 in spanning member 43 is arranged to be engaged. Pin 52 may be held out of engagement with socket member 51 by supports 53, 53 during operation of conveyor 15 for feeding.

Rails 54 may be provided from the side of the machine opposite rails 23 down which the completed tubes may be rolled to remove them from conveyor 15 after they have been withdrawn from the forming machine onto conveyor 15 by the dog 47.

The operation of the machine will be understood from the foregoing description, it being apparent that conveyor 15 is first used to feed a tube into the machine and then to actuate the withdrawing mechanism and to receive the finished tube as it is withdrawn, the tubes being fed onto the conveyor 15 from one side and removed from the other side.

Modifications of the invention may be resorted to without departing from the spirit thereof or the scope of the appended claims.

What is claimed is:—

1. The combination with a tube-forming machine having a mandrel with a free end, of apparatus for applying and removing the tubes, said apparatus comprising a conveyor for supporting a tube in line with the mandrel and for feeding the tube onto the mandrel, means for actuating the conveyor toward and from the forming machine, means for rolling a tube onto conveyor from one side, a pusher on the conveyor engageable with the adjacent end of the tube, a carriage operable into and out of the forming machine, a dog on the carriage engageable with the remote end of the formed tube to withdraw the said tube onto the conveyor as the carriage is withdrawn, means for connecting the carriage to the conveyor for actuation thereby, said dog and said connecting means being adapted to be held out of operation during actuation of the conveyor for feeding, and means on which the finished tube may be rolled from the other side of the conveyor.

2. The combination with a tube-forming machine having a mandrel with a free end, of apparatus for applying and removing the tubes, said apparatus comprising a conveyor for supporting a tube in line with the mandrel and for feeding the tube onto the mandrel, means for actuating the conveyor toward and from the forming machine, a pusher on the conveyor engageable with the adjacent end of the tube, a carriage operable into and out of the forming machine, a dog on the carriage engageable with the remote end of the formed tube to withdraw the said tube onto the conveyor as the carriage is withdrawn, and means for connecting the carriage to the conveyor for actuation thereby, said dog and said connecting means being adapted to be held out of operation during actuation of the conveyor for feeding.

3. The combination with a tube-forming machine having a mandrel with a free end, of apparatus for applying and removing the tubes, said apparatus comprising a conveyor for supporting a tube in line with the mandrel and for feeding the tube onto the mandrel, means for actuating the conveyor toward and from the forming machine, a pusher on the conveyor engageable with the adjacent end of the tube, a carriage operable into and out of the forming machine, a dog on the carriage engageable with the remote end of the formed tube to withdraw the said tube onto the conveyor as the carriage is withdrawn, and means for connecting the carriage to the conveyor for actuation thereby.

4. The combination with a tube-forming machine having a mandrel with a free end, of apparatus for applying and removing the tubes, said apparatus comprising a conveyor for supporting a tube in line with the mandrel and for feeding the tube onto the mandrel, means for actuating the conveyor toward and from the forming machine, a carriage operable into and out of the forming machine, a dog on the carriage engageable with the remote end of the formed tube to withdraw the said tube onto the conveyor as the carriage is withdrawn, and means for connecting the carriage to the conveyor for actuation thereby.

5. The combination with a tube-forming machine having a mandrel with a free end, of apparatus for applying and removing the tubes, said apparatus comprising a conveyor for supporting a tube in line with the mandrel and for feeding the tube onto the mandrel, means for actuating the conveyor toward and from the forming machine, and means operable by the conveyor for withdrawing the tube from the mandrel onto the conveyor.

6. The combination with a tube-forming machine having a mandrel with a free end, of apparatus for applying the tubes on said mandrel, said apparatus comprising a conveyor for supporting a tube in line with the mandrel and for feeding the tube onto the mandrel, means for actuating the conveyor toward and from the forming machine, means for rolling a tube onto the conveyor from one side, and a pusher on the conveyor engageable with the adjacent end of the tube.

7. The combination with a tube-forming machine having a mandrel with a free end, of apparatus for applying the tubes on said mandrel, said apparatus comprising a conveyor for supporting a tube in line with the mandrel and for feeding the tube onto the mandrel, means for actuating the conveyor toward and from the forming machine, and means for rolling a tube onto the conveyor from one side.

8. The combination with a tube-forming machine having a mandrel with a free end, of apparatus for removing the tubes from said mandrel, said apparatus comprising a conveyor in line with the mandrel, means for actuating the conveyor toward and from the forming machine, a carriage operable into and out of the forming machine, a dog on the carriage engageable with the remote end of the formed tube to withdraw the formed tube onto the conveyor as the carriage is withdrawn, means for connecting the carriage to the conveyor for actuation thereby, and means on which the finished tube may be rolled from the conveyor.

9. The combination with a tube-forming machine having a mandrel with a free end, of apparatus for removing the tubes from said mandrel, said apparatus comprising a conveyor in line with the mandrel, means for actuating the conveyor toward and from the forming machine, a carriage operable into and out of the forming machine, a dog on the carriage engageable with the remote end of the formed tube to withdraw the said tube onto the conveyor as the carriage is withdrawn, and means for connecting the carriage to the conveyor for actuation thereby.

10. The combination with a tube-forming machine having a mandrel with a free end, of apparatus for removing the tubes from said mandrel, said apparatus comprising a conveyor in line with the mandrel, means for actuating the conveyor toward and from the forming machine, a carriage operable into and out of the forming machine, a dog on the carriage engageable with the remote end of the formed tube to withdraw the said tube onto the conveyor as the carriage is withdrawn, said dog being pivoted to ride over the article as the carriage moves into the forming machine, and means for connecting the carriage to the conveyor for actuation thereby.

11. The combination with a tube-forming machine having a mandrel with a free end, of apparatus for removing the tubes from said mandrel, said apparatus comprising a conveyor in line with the mandrel, means for actuating the conveyor toward and from the forming machine, and means operable by the conveyor for withdrawing the tube from the mandrel onto the conveyor.

12. The combination in apparatus for conveying elongated articles to and from a machine, of a conveyor for receiving the articles and movable toward and from the machine, a carriage above the conveyor operable into and out of the machine and having means thereon for engaging the article to withdraw it from the machine, and means for detachably connecting the carriage to the conveyor for actuation thereby.

13. The combination in apparatus for supplying elongated articles to and removing them from forming machines, said combination comprising a conveyor for receiving the articles and movable toward and from the machine, means operable by the conveyor for actuating an article into the machine, means operable by the conveyor for withdrawing the article from the machine, means for conveying the article transversely onto the conveyor, and means for removing the article transversely from the conveyor.

14. The combination in apparatus for supplying elongated articles to and removing them from forming machines, said combination comprising a conveyor for receiving the articles and movable toward and from the machine, means operable by the conveyor for actuating an article into the machine, and means operable by the conveyor for withdrawing the article from the machine.

15. The combination in apparatus for supplying elongated tapered articles to and removing them from forming machines at one end thereof, comprising a conveyor in alinement with the forming machine at one end thereof and operable to feed an article into the machine, and means to remove the article from said machine onto said conveyor.

16. The combination with a tube-forming machine including a mandrel, means for supporting the mandrel in a position with one end free, and means for supporting said end of the mandrel when the tube is being formed thereon, said mandrel being movable from said support to said position, of means adapted to receive and support a tube in line with said mandrel when supported in said position and operable to move the tube onto said mandrel.

17. The combination with a tube-forming machine including a mandrel, means for supporting the mandrel in a position with one end free, and means for supporting said end of the mandrel from which said mandrel is movable to said position, of means aligned with said mandrel when in said position and operable into said machine to engage a tube thereon and operable out of the machine to remove the tube from the mandrel.

JULIUS H. SCHLAFLY.